United States Patent [19]
DeBusk et al.

[11] Patent Number: 6,014,633
[45] Date of Patent: Jan. 11, 2000

[54] METHOD FOR THE ANALYSIS AND STANDARDIZATION OF BILLS OF RESOURCES

[75] Inventors: Brian C. DeBusk; Elizabeth C. DeBusk; Mark W. Shanks, all of Clinton, Tenn.

[73] Assignee: DeRoyal Business Systems, L.L.C., Powell, Tenn.

[21] Appl. No.: 08/936,780

[22] Filed: Sep. 24, 1997

[51] Int. Cl.[7] .................................................. G06F 15/24
[52] U.S. Cl. ..................................................... 705/7; 705/8
[58] Field of Search ........................ 705/2, 3, 7, 28, 705/29, 8; 364/468.13, 468.14

[56] References Cited

U.S. PATENT DOCUMENTS

| | | | |
|---|---|---|---|
| 4,174,598 | 11/1979 | Shepherd et al. | 53/431 |
| 4,987,538 | 1/1991 | Johnson et al. | 364/401 |
| 5,001,630 | 3/1991 | Wiltfong | 364/401 |
| 5,168,445 | 12/1992 | Kawashima et al. | 705/10 |
| 5,235,795 | 8/1993 | DeBusk | 53/467 |
| 5,287,267 | 2/1994 | Jayaraman et al. | 705/10 |
| 5,295,067 | 3/1994 | Cho et al. | 705/29 |
| 5,307,260 | 4/1994 | Watanabe et al. | 395/500 |
| 5,321,605 | 6/1994 | Chapman et al. | 705/7 |
| 5,325,293 | 6/1994 | Dorne | 364/413.01 |
| 5,517,405 | 5/1996 | McAndrew et al. | 364/401 |
| 5,557,514 | 9/1996 | Seare et al. | 364/401 |
| 5,583,758 | 12/1996 | McIlroy et al. | 395/202 |
| 5,627,973 | 5/1997 | Armstrong et al. | 705/10 |
| 5,727,161 | 3/1998 | Purcell, Jr. | 705/30 |
| 5,732,401 | 3/1998 | Conway | 705/29 |
| 5,752,234 | 5/1998 | Withers | 705/2 |
| 5,771,172 | 6/1998 | Yamamoto et al. | 364/468.13 |
| 5,777,877 | 7/1998 | Beppu et al. | 364/468.03 |
| 5,835,910 | 2/1998 | Kavanagh et al. | 707/103 |

FOREIGN PATENT DOCUMENTS

| | | | |
|---|---|---|---|
| 0 556 093 A1 | 2/1993 | European Pat. Off. | B65B 61/20 |

OTHER PUBLICATIONS

Edgerton, Robert B; Kunishige, Steven Y; "Project Controls in the Semiconductor Industry", Transactions of AACE International, pp. CS171–CS175, 1996, ISSN: 1074–7397.

Foxlow, Tim; "Knowledge–based Manufacturing: The Key to Recovery", Logistics Information Management v7n4 pp. 23–26, 1994, ISSN: 0957–6053.

Primary Examiner—Allen R. MacDonald
Assistant Examiner—John Campa
Attorney, Agent, or Firm—Luedeka, Neely & Graham, PC

[57] ABSTRACT

Disclosed is a method for the analysis and standardization of bills of resources to be used during the performance of a given procedure. Bills of resources to be analyzed are converted to models for manipulation. The models are manipulated according to a mathematical algorithm which highlights their relative similarities and dissimilarities. The manipulated models are then expressed in a manner in which the highlighted similarities and dissimilarities are perceptible. Based upon this expression the utilization, consumption, or other characteristic of the bills of resources or the resource listed therein may be analyzed. In one embodiment of the invention, the expression of the manipulated models is utilized to identify groups of similar bills of resources and a standard bill of resources for each group of similar bills of resources is calculated. This standard bill of resources is then substituted for the different bills resources in each defined group.

37 Claims, 7 Drawing Sheets

| Component | Description | Qty | Cost |
|---|---|---|---|
| 142 | FESS/SEPTO TRACEPAK | 1.00 | 82.36 |
| 91-DELV00010070 | DELV CARE EVENT | 1.00 | 17.81 |
| 92-DER00709 | DER SUPPLY BUNDLE FOR DELV | 1.00 | 17.81 |
| 56-11099 | BOX, TRACECART 20.5 X 19 X 34.375" | 1.00 | 1.65 |
| 56-11359R | BASE, RETRACE TRACECRT, 40 GAL | 1.00 | 10.00 |
| 56-52346 | LID, RETRACE, TRACECART | 1.00 | 6.00 |
| 56-52629 | LBL:"TRACEPAK IN PROCESS" 2 X 3 | 1.00 | 0.02 |
| 56-52630 | LBL:"TRACEPAK COMPLETE" 4 X 3 BLU | 1.00 | 0.04 |
| TPAK-LAB | LBL:8" BLNK WTE RL "TRCPK CONTE" | 1.00 | 0.10 |
| 91-OPER00010070 | OPER CARE EVENT | 1.00 | 64.55 |
| 92-DER00705 | DER SUPPLY BUNDLE FOR OPER | 1.00 | 47.65 |
| 25-002 | PAD, INSTR MAGNETIC 20 X 16 | 1.00 | 9.29 |
| 50-6066 | TRAY, NASAL | 0.33 | 88.71 |
| 50-6066P | NASAL TRAY | 1.00 | 29.57 |
| 5-0402 | NDL CTR, FOAM BLOCK/MAGNET 10CT | 1.00 | 0.64 |
| 5-1163 | GZE, 4 X 4 12 PLY NOXR INDEX 10 S | 9.99 | 0.20 |
| 5-1175 | GZE, 4 X 4 16 PLY XR BANDED 10 S | 9.99 | 0.50 |
| 5-1583 | BAG, STERILIZATION 27 X 34" 4MIL | 1.00 | 0.90 |
| 5-15926 | GWN, LG FAB-REIN CHST&SLV, ULTRA | 2.00 | 5.56 |
| 5-16988 | SPG, NEURO .5X3 PATT 10CR X R | 1.00 | 2.50 |
| 5-17748 | CVR, BK TBL 54 X 85 | 1.00 | 0.99 |
| 5-1871 | BOWL, 32 OZ SPONGE BLUE 1000CC | 1.00 | 0.12 |
| 5-1873 | BOWL, 16 OZ 500CC | 1.00 | 0.09 |
| 5-1887 | DISH, PETRI 100X 15MM W/O RING | 1.00 | 0.12 |
| 5-1892 | CUP, MEDICINE 2OZ (HKA0059990) | 1.00 | 0.04 |
| 5-2894 | NDL, 27 GX1-1/2"LL, RB, OR/ER, ST | 2.00 | 0.12 |
| 5-2919 | SYR, 20CC, LS (ST 520640) | 1.00 | 0.22 |
| 5-3033 | SYR, 5CC, LL (ST#309603) | 2.00 | 0.16 |
| 5-3049 | SYR, 3CC LL (513934) | 2.00 | 0.08 |
| 5-3107 | BAG, SUT 6.5 X 11.3 WT NON-LATEX | 2.00 | 0.06 |
| 5-3183 | BLD, 15, SS, ST | 2.00 | 0.44 |
| 5-3244 | TBG, SUCT 1/4 X 12 NC FEMALE/CONN | 2.00 | 1.36 |
| 5-4138 | CVR, MAYO STD 23 X 54, BL | 1.00 | 0.39 |
| 5-5042 | TWL, OR BLUE COTTON/NS | 9.99 | 7.50 |
| 5-5453 | CTA, 6" WOOD | 19.98 | 0.00 |
| 5-6111 | CUP, 4OZ SPECIMEN W/SCREW LID | 2.00 | 0.16 |
| 5-6240 | DRP, EENT SPLIT 72 X 115, W/TAPE | 1.00 | 4.61 |
| 5-6445 | TAPE STRIP, 2 X 5" W/DEROYAL LOGO | 1.00 | 0.04 |
| 5-9042 | DRP, BAR 44 X 38, W/TAPE | 1.00 | 1.28 |
| SA50-6066P-1 | TRAY W/SLEEVE PROTECTOR | 1.00 | 1.47 |
| 5-13188 | PROTECTOR, TRAY LARGE 18 X 26" | 1.00 | 0.79 |
| 5-1828 | TRAY, FLAT PLATFORM 15 X 13.5 X 1" | 1.00 | 0.68 |
| TRLAB-001 | LBL: DEROYAL 1-UP TRAY STER | 1.00 | 0.02 |
| 55-51260 | FOG INHIBITOR, ENDOMATE | 1.00 | 2.85 |
| 55-51947 | SPG, NEURO .5 X 3 PATT 10PK | 1.00 | 4.17 |
| M10-049 | PAD, WHEELCHAIR 20" X 6.5" X 3/4" | 3.00 | 1.80 |
| 92-OMI00705 | OMI SUPPLY BUNDLE FOR OPER | 1.00 | 16.90 |
| 001346200202 | EXTENSION SET 20 INCH STERILE | 1.00 | 0.56 |
| 001361380313 | SODIUM CHL 0.9% IRRIGATION | 1.00 | 0.00 |
| 0013V302401 | LINER 2000ML W/LID V30240101 | 2.00 | 2.74 |
| 1825003435 | TB CONN SUCT 1/4 | 2.00 | 2.30 |
| 3583001050 | DRSG TELFA STRL | 1.00 | 0.14 |
| 3642089601 | CVR STAND MAYO 23-1/2 | 1.00 | 2.00 |
| 4056004711 | BAGS LINEN O R | 1.00 | 0.38 |
| 4056004741 | BAG HEAVY DUTY RED 23 X 8 X 41 | 1.00 | 3.06 |
| 5817220100 | NDL PNL 22GX | 1.00 | 1.82 |
| 66080E0509 | VALLEY LAB CAUTERY BIPOLAR | 1.00 | 3.90 |

Fig. 4

| Component | Description | Usage | Each | Qty | Cost | 142 | 143 | 145 | 146 |
|---|---|---|---|---|---|---|---|---|---|
| 001346200202 | EXTENSION SET 20 INCH STERILE | 0.50 | 0.56 | 2.00 | 1.12 | 1.00 | | | 1.00 |
| 001361380313 | SODIUM CHL 0.9% IRRIGATION | 0.75 | 0.00 | 3.00 | 0.00 | 1.00 | 1.00 | | 1.00 |
| 001379730505 | WATER, STERILE FOR IRRIG | 0.25 | 2.05 | 1.00 | 2.05 | | | | 1.00 |
| 0013V302401 | LINER 2000ML W/LID v30240101 | 1.00 | 1.37 | 8.00 | 10.96 | 2.00 | 2.00 | 2.00 | 2.00 |
| 0421501007 | TB SUCT FLEX STRL | 0.25 | 0.97 | 1.00 | 0.97 | | 1.00 | | |
| 0723305128 | NDL SPEC USE 30GX1 | 0.25 | 0.79 | 1.00 | 0.79 | | 1.00 | | |
| 1825003435 | TB CONN SUCT 1/4 | 1.00 | 1.15 | 8.00 | 9.20 | 2.00 | 2.00 | 2.00 | 2.00 |
| 2478400426 | MERECO SLIM KENNEDY | 0.25 | 11.25 | 1.00 | 11.25 | | | | 1.00 |
| 25-002 | PAD, INSTR MAGNETIC 20 X 16 | 1.00 | 9.29 | 4.00 | 37.16 | 1.00 | 1.00 | 1.00 | 1.00 |
| 3583001050 | DRSG TELFA STRL | 0.50 | 0.14 | 2.00 | 0.28 | 1.00 | | | 1.00 |
| 3642089601 | CVR STAND MAYO 23-1/2 | 1.00 | 2.00 | 4.00 | 8.00 | 1.00 | 1.00 | 1.00 | 1.00 |
| 4056004711 | BAGS LINEN O R | 1.00 | 0.38 | 4.00 | 1.52 | 1.00 | 1.00 | 1.00 | 1.00 |
| 4056004741 | BAG HEAVY DUTY RED 23 X 8 X 41 | 1.00 | 3.06 | 4.00 | 12.24 | 1.00 | 1.00 | 1.00 | 1.00 |
| 4509001179 | ELECTRODE ADH CONDU 2 SPLIT LG | 0.25 | 3.80 | 1.00 | 3.80 | | | 1.00 | |
| 5-0402 | NDL CTR, FOAM BLOCK/MAGNET 10CT | 1.00 | 0.64 | 4.00 | 2.56 | 1.00 | 1.00 | 1.00 | 1.00 |
| 5-1163 | GZE, 4 X 4 12 PLY NOXR INDEX 10S | 1.00 | 0.02 | 49.96 | 1.00 | 9.99 | 9.99 | 19.99 | 9.99 |
| 5-1175 | GZE, 4 X 4 16 PLY XR BANDED 10S | 1.00 | 0.05 | 39.96 | 2.00 | 9.99 | 9.99 | 9.99 | 9.99 |
| 5-1201 | SPG, TONSIL 1", SNGL STRNG NS | 0.25 | 0.07 | 5.00 | 0.35 | | | 5.00 | |
| 5-13188 | PROTECTOR, TRAY LARGE 18 X 26" | 1.00 | 0.79 | 5.00 | 3.95 | 1.00 | 1.00 | 2.00 | 1.00 |
| 5-1583 | BAG, STERILIZATION 27 X 34" 4MIL | 1.00 | 0.90 | 5.00 | 4.50 | 1.00 | 1.00 | 2.00 | 1.00 |
| 5-15926 | GWN, LG FAB-REIN CHST&SLV, ULTRA | 1.00 | 2.78 | 7.99 | 22.22 | 2.00 | 2.00 | 2.00 | 2.00 |
| 5-1595 | BAG, GLASSINE 3 X 5.5 (004) | 0.25 | 0.01 | 1.00 | 0.01 | | | 1.00 | |
| 5-16988 | SPG, NEURO .5 X 3 PATT 10CR X R | 1.00 | 2.50 | 4.00 | 9.99 | 1.00 | 1.00 | | 1.00 |
| 5-17748 | CVR, BK TBL 54 X 85 | 1.00 | 0.99 | 5.00 | 4.95 | 1.00 | 1.00 | 2.00 | 1.00 |
| 5-1828 | TRAY, FLAT PLATFORM 15 X 13.5 X 1" | 1.00 | 0.68 | 5.00 | 3.40 | 1.00 | 1.00 | 2.00 | 1.00 |
| 5-1829 | TRAY, LG DEEP 9.72 X 5.4 X 2 | 0.25 | 0.15 | 1.00 | 0.15 | | | 1.00 | |
| 5-1871 | BOWL, 32 OZ SPONGE BLUE 1000CC | 1.00 | 0.12 | 5.00 | 0.60 | 1.00 | 1.00 | 2.00 | 1.00 |
| 5-1873 | BOWL, 16 OZ 500CC | 1.00 | 0.09 | 4.00 | 0.36 | 1.00 | 1.00 | 1.00 | 1.00 |
| 5-1887 | DISH, PETRI 100 X 15MM W/O RING | 1.00 | 0.12 | 4.00 | 0.48 | 1.00 | 1.00 | 1.00 | 1.00 |
| 5-1892 | CUP, MEDICINE 2 OZ (HKA0059990) | 1.00 | 0.04 | 6.00 | 0.24 | 1.00 | 1.00 | 3.00 | 1.00 |
| 5-2894 | NDL, 27GX1-1/2"LL, RB, OR/ER, ST | 1.00 | 0.06 | 7.99 | 0.48 | 2.00 | 2.00 | 2.00 | 2.00 |
| 5-2919 | SYR, 20CC, LS (ST 520640) | 1.00 | 0.22 | 4.00 | 0.88 | 1.00 | 1.00 | 1.00 | 1.00 |
| 5-3033 | SYR, 5CC, LL (ST#309603) | 1.00 | 0.08 | 7.99 | 0.64 | 2.00 | 2.00 | 2.00 | 2.00 |
| 5-3049 | SYR, 3CC LL (513934) | 1.00 | 0.04 | 7.99 | 0.32 | 2.00 | 2.00 | 2.00 | 2.00 |
| 5-3050 | SYR, IRRIG 50CC BULB | 0.25 | 0.28 | 1.00 | 0.28 | | | 1.00 | |
| 5-3056 | SYR, 12CC LL (512878) | 0.25 | 0.09 | 1.00 | 0.09 | | | 1.00 | |
| 5-3107 | BAG, SUT 6.5 X 11.3 WT NON-LATEX | 1.00 | 0.03 | 7.99 | 0.24 | 2.00 | 2.00 | 2.00 | 2.00 |
| 5-3183 | BLD, 15, SS, ST | 1.00 | 0.22 | 7.99 | 1.76 | 2.00 | 2.00 | 2.00 | 2.00 |
| 5-3244 | TBG, SUCT 1/4 X 12 NC FEMALE/CONN | 1.00 | 0.68 | 8.99 | 6.11 | 2.00 | 2.00 | 3.00 | 2.00 |
| 5-3274 | CATH, URETH ALL PURP RR 8FR 2E | 0.25 | 0.36 | 1.00 | 0.36 | | | 1.00 | |
| 5-3735 | SUCTCOAG, FOOTCTRL 6" 10FR | 0.25 | 7.38 | 1.00 | 7.38 | | | 1.00 | |
| 5-4138 | CVR, MAYO STD 23 X 54, BL | 1.00 | 0.39 | 5.00 | 1.95 | 1.00 | 1.00 | | 1.00 |
| 5-5042 | TWL, OR BLUE COTTON /NS | 1.00 | 0.75 | 43.96 | 32.97 | 9.99 | 9.99 | 13.99 | 9.99 |
| 5-5453 | CTA, 6" WOOD | 1.00 | 0.00 | 79.92 | 0.00 | 19.98 | 19.98 | 19.98 | 19.98 |
| 5-6033 | BOX, 21.5 X 21.5 X 14" PRINTED | 0.25 | 1.58 | 0.20 | 0.32 | | | 0.20 | |
| 5-6111 | CUP, 4 OZ SPECIMEN W/SCREW LID | 1.00 | 0.08 | 7.99 | 0.64 | 2.00 | 2.00 | 2.00 | 2.00 |
| 5-6240 | DRP, EENT SPLIT 72 X 115, W/TAPE | 1.00 | 4.61 | 4.00 | 18.42 | 1.00 | 1.00 | 1.00 | 1.00 |
| 5-6445 | TAPE STRIP, 2 X 5" W/DERPYAL LOGO | 1.00 | 0.04 | 4.00 | 0.16 | 1.00 | 1.00 | 1.00 | 1.00 |
| 5-8284 | WRP, 48 X 48, KIMG REG | 0.25 | 0.27 | 1.00 | 0.27 | | | 1.00 | |
| 5-9042 | DRP, BAR 44 X 38, W/TAPE | 1.00 | 1.28 | 4.00 | 5.11 | 1.00 | 1.00 | 1.00 | 1.00 |
| 55-51260 | FOG INHIBITOR, ENDOMATE | 1.00 | 2.85 | 4.00 | 11.40 | 1.00 | 1.00 | 1.00 | 1.00 |
| 55-51947 | SPG, NEURO .5 X 3 PATT 10PK | 1.00 | 4.17 | 4.00 | 16.68 | 1.00 | 1.00 | 1.00 | 1.00 |
| 56-11099 | BOX, TRACECART 20.5 X 19 X 34.375" | 1.00 | 1.65 | 4.00 | 6.60 | 1.00 | 1.00 | 1.00 | 1.00 |
| 56-11359R | BASE, RETRACE TRACECRT, 40 GAL | 1.00 | 10.00 | 4.00 | 40.00 | 1.00 | 1.00 | 1.00 | 1.00 |
| 56-52346 | LID, RETRACE, TRACECART | 1.00 | 6.00 | 4.00 | 24.00 | 1.00 | 1.00 | 1.00 | 1.00 |
| 56-52629 | LBL.:"TRACEPAK IN PROCESS" 2 X 3 | 1.00 | 0.02 | 4.00 | 0.08 | 1.00 | 1.00 | 1.00 | 1.00 |
| 56-52630 | LBL.:"TRACEPAK COMPLETE" 4 X 3 BLU | 1.00 | 0.04 | 4.00 | 0.16 | 1.00 | 1.00 | 1.00 | 1.00 |
| 5817220100 | NDL SPNL 22GX | 0.75 | 1.82 | 3.00 | 5.46 | 1.00 | 1.00 | | 1.00 |
| 5937000370 | TONGUE BLADES JR. STERILE | 0.25 | 0.03 | 2.00 | 0.06 | | 2.00 | | |
| 66080E0509 | VALLEY LAB CAUTERY BIPOLAR | 1.00 | 3.90 | 4.00 | 15.60 | 1.00 | 1.00 | 1.00 | 1.00 |
| M10-049 | PAD, WHEELCHAIR 20" X 6.5" X 3/4" | 1.00 | 0.60 | 12.00 | 7.20 | 3.00 | 3.00 | 3.00 | 3.00 |
| TPAK-LAB | LBL: 8" BLNK WTE RL "TRCPK CONTE" | 1.00 | 0.10 | 4.00 | 0.40 | 1.00 | 1.00 | 1.00 | 1.00 |
| TRLAB-001 | LBL: DEROYAL 1-UP TRAY STER | 1.00 | 0.02 | 0.10 | 0.10 | 1.00 | 1.00 | 2.00 | 1.00 |

METHOD FOR THE ANALYSIS AND STANDARDIZATION OF BILLS OF RESOURCES

FIELD OF THE INVENTION

This invention relates to the field of analysis and development of bills of resources to be used during a procedure and, particularly, to a method for depicting relationships among different bills of resources and analyzing or refining resource utilization based thereon.

BACKGROUND OF THE INVENTION

Bills of resources are used in a variety of situations in order to insure that all of the resources necessary to perform certain tasks or procedures are available at the time that a procedure is to be performed. One of the simplest bills of resources would be a parts list for use during the assembly of an item. A more complex bill of resources might include a parts list as well as a list of required tools needed to complete the assembly of an item. For an extremely critical procedure, such as a medical operation, or the servicing of a vital component on an airplane or other piece of critical machinery, the bill of resources might well include parts, tools, equipment and labor resources required to perform the procedure.

In certain environments, similar procedures are conducted on a regular basis and, although the individuals performing the procedure may change or the procedure may vary slightly from one performance to the next, the necessary resources will be similar each time the procedure is performed. However, it is extremely likely that the resources allocated to the performance of the procedure from one time to the next will likely vary substantially based upon who is performing the procedure, variations in subjects of the procedure, when and where the procedure is performed, etc. Frequently, such variations in the bill of resources from each performance of the procedure will not reflect actual differing circumstances in the performance of the procedure, but will be a matter of habit, personal preference or even chance. However, it should be recognized that such variation adds costs and reduces efficiency. For example, such variation will likely require the stocking of multiple equivalent components in inventory which will tend to require the maintenance of a larger inventory and reduce discounts that might be received for bulk purchases of a single item. Furthermore, such variation reduces the accuracy of forecasts for required components, labor resources or equipment, since actual utilization will vary substantially from one performance to the next.

This problem is especially acute in the medical care field where substantial pressure is placed to reduce costs without compromising the quality of care. One trend is to move increasingly toward procedure based unitized delivery systems in which a large portion of the supplies used in medical procedure are provided in one container. These systems allow for hospitals, and other health care facilities, to order just the supplies needed at the time a procedure is scheduled. Thus, the hospital may reduce their inventory of stocked supplies, labor associated with pulling supplies for a procedure, and use just-in-time ordering techniques which help to reduce costs. However, these procedure based delivery systems have some drawbacks.

First, doctors are often very particular about the brand and style of medical supplies they use. For example, one doctor may prefer one brand of cautery pencil for his heart surgeries while a different doctor may prefer a different brand for the same surgery. Frequently, the number of doctor preferred items will be large, thus requiring either that a number of different bills of resources be used for a given procedure, or that the hospital stock all of the doctor preference items and that they be pulled from inventory prior to performance of the procedure. However, these solutions often negate the advantages of the unitized delivery system since the stocking of doctor preference items will serve to increase inventory and labor requirements and the increase of bills of resources will prevent the supplier from generating economy of scale savings based on volume in a given bill of resources.

Also, these procedure based unitized delivery systems do not address resource areas other than supplies. While supplies are a major component of a medical procedure, labor resources, reusable supplies and durable equipment are all important resources utilized in a medical procedure and their use should be analyzed and optimized.

Considerable cost savings in the medical and other fields could be realized if there were an automated and convenient method for analyzing and optimizing resource allocation and usage. For example, in the above example of doctor preferences in the same types of surgeries, it is known that doctors only express strong preferences with respect to a relatively small number of supplies. However, hospitals have typically used doctor preference cards as a whole bill of resources and, when given a choice, doctors will select a product with which they are familiar. Thus, there are often substantial chances to standardize or optimize preference cards for items about which doctors do not have strong preferences. Also, some doctors, because of a lack of historical information, will overbook other resources such as anesthesiologists, equipment, etc. just to make sure that the resource is available when needed; although, with good resource usage analysis, the doctor would be willing to standardize the scheduling of such resources.

The benefits of standardized bills of resources are varied and complex. With respect to supply standardization, enormous cost savings are available if supply consumption is standardized. The health care facility, supply distributor and manufacturers, when bills of resources are optimized, can benefit from inventory reduction, economies of scale, increased certainty in supply and demand, utilization of just-in-time manufacturing, shipping and inventory techniques, etc., because of the enhanced certainty of which supplies will be required. Furthermore, from the standpoint of the health care facility, the efficiency in the usage of labor and equipment resources can be increased by standardization by eliminating unproductive time and having a more certain knowledge of when labor and equipment resources will be required and used. Such knowledge will allow for more careful planning in the acquisition, training and utilization of such resources.

However, although the type and extent of possible benefits from standardization have been desired for some time, the problem has been so complex that standardization has taken place on a superficial and ad hoc basis, when even attempted. For example, some healthcare facilities have opted into group purchasing plans in which the group will negotiate with certain suppliers for certain types of supplies in order to get the best price. With respect to this type of solution, for the few products affected, the best price may be obtained. However, such solutions typically relate only to small groups or classes of supplies and do not take into account actual usage history, real doctor preferences, procedure specific requirements and certainly do not address labor, re-usable supplies and durable equipment resource utilization. There is simply no consistent, logical and proven method for the standardization of procedure based bills of resources.

The problem of bill of resource standardization and optimization is a complex one. For a relatively common procedure, such as a heart bypass operation, a vast number of different resources must be utilized. The list of medical supplies for the procedure runs many pages and a wide variety of labor and equipment resources must be brought together at just the right time. If the resources are expressed in mathematical terms, you get a problem with potentially hundreds of variables. Furthermore, each individual heart bypass procedure is a new mathematical problem with an equally large number of variables. Thus, simple and known analytical techniques are not readily adaptable to the problem of analyzing and optimizing bills of resources.

It is therefore and object of the present invention to provide a method for the analysis and optimization of bills of resources for a given procedure or procedures.

It is a further object of the present invention to provide a method for the standardization of bills of resources for a given procedure or across multiple procedures.

It is yet a further object of the present invention to provide a method for the analysis of resource utilization for a given procedure or procedures.

It is still a further object of the present invention to provide a method for standardizing bills of materials to be used during a given procedure.

It is another object of the present invention to provide a method for optimizing a bill or bills of resources in medical procedures, including material, labor and equipment resources.

It is yet another object of the present invention to provide an integrated method for the optimization of labor allocation, supply ordering and delivery and equipment allocation in a healthcare facility on a procedural basis.

SUMMARY OF THE INVENTION

The above and further objects are realized in a method practiced in accordance with the preferred embodiments of the present invention. In a preferred embodiment of the present invention, a method for the analysis of bills of resources, which include a list of resources to be utilized in performing a procedure is provided. In practicing the method, desired bills of resources are selected from a larger group of known bills of resources. A model is then created for each selected bill of resources. Each of the models has values associated therewith which correspond to the resources to be utilized in performing the associated procedure. These values, at least, include the number of units of given resources from the bill of resources.

The models are then manipulated mathematically to highlight similarities and dissimilarities of defined characteristics of the models. The manipulated models are then expressed in a manner in which the relative position of each of the models may be determined. The manner in which the models are expressed is selected such that the position of each of the models relative to the other manipulated models is representative of the degree of similarity of the models to each other. Finally, based upon the expression of the manipulated models, the bills of resources may be analyzed by a user in order to optimize resource utilization, characterize resource utilization or consumption and/or investigate resource consumption.

In a further preferred embodiment of the present invention, the step of expressing the models further includes the step of graphically plotting the position of each model for display. Further, the step of analyzing the bills of resources includes analyzing the graphical display to identify data points which are relatively close together to thus identify similar bills of resources.

In yet a further preferred embodiment of the preferred invention, the step of analyzing the expressed models includes the further steps of grouping similar models together to select a subset of the selected of bills of resource for the purposes of standardization. Then a standard bill of resources is developed for the grouped bills of resources. In an additional embodiment of this invention, the standard bill of resources is generated by calculating the center of mass of the selected group of models, determining the coordinates of the center of mass and recovering the standard bill of resources utilizing the coordinates of the center of mass. In a further embodiment of this invention, the center of mass is calculated using weighting values assigned to each expressed model; such weighting values are assigned on the basis of the relative importance of each of the bills of resources from which the models are generated.

In another preferred embodiment of the present invention, a computer implemented method for the analysis of bills of resources used during the performing of a procedure is provided. Initially, the computer implemented method includes the definition of a set of bills of resources for analysis. The defined set of bills of resources are then provided to a computer for development of a set of electronic bills of resources corresponding to the defined set of bills of resources. The electronic bills of resources are manipulated according to an algorithm which characterizes the electronic bills of resources according to their degree of similarity relative to each other. The manipulated electronic bills of resources are then expressed in a human or machine perceptible format such that the relative similarity or dissimilarity of the bills of resources may be determined and the expressed bills of resources are analyzed to enhance or optimize resource utilization or to analyze resource consumption.

In a further embodiment of the computer implemented method, the step of providing the defined set of bills of resources further includes generating a computer model of each of the bills of resources from the defined set of bills of resources. Then, the models are organized in database program. Finally, a computer generated matrix is constructed from the models wherein one dimension of the matrix is determined by the number of bills of resources in the defined set of bills of resources and the other dimension of the matrix is determined by the total number of different resources across all of the selected bills of resources.

In yet a further embodiment of the computer implemented method, the step of mathematically manipulating the defined set of bills of resources includes selecting a desired number of dimension in which each of the models will be expressed and operating on the matrix in accordance with an algorithm in order to reduce at least one dimension of the matrix to the desired number of dimension. In yet further embodiments of the present invention, the mathematical manipulation involves the techniques of matrix factorization and rank reduction and in a further embodiment, the matrix factorization technique consists of singular value decomposition.

BRIEF DESCRIPTION OF THE DRAWINGS

The above and further features of the preferred embodiments may be best understood with reference to the following Detailed Description and the Figures in which:

FIG. 4 is a printout of a model developed in accordance with a preferred embodiment of the present invention;

FIG. 5 is a printout of a matrix prepared for use in accordance with a preferred embodiment of the present invention;

DETAILED DESCRIPTION OF THE INVENTION

Before describing the method of the present invention, it is necessary to develop some background information on the creation and use of procedural bills of resources. Almost any procedure may be described in the context of a procedural pathway; i.e. a series of related events, or sub-procedures, which are steps in the completion of a given procedure. A procedural pathway may be very general or extremely detailed. For example, with respect to a procedure such as changing a jet engine, the procedure could be generally described by the pathway: 1) prepare airplane, 2) remove old engine, 3) install new engine, 4) test airplane. Obviously, each of the steps described above entails much more detail work than is present in the pathway. However, starting with a general pathway, each step can be broken down into increasingly more complex and detailed pathways until, at the greatest level of detail, an explicit step by step process is described for each activity required to complete the procedure. Basically, the procedural pathway concept provides for a ready methodology for describing and analyzing how procedures are performed and understanding what is required to perform the procedure.

A bill of resources is simply a list of materials, equipment, personnel, supplies, facilities, etc. that are required in order to allow a procedure to be completed. In the example above, the bill of resources would include, among other things, a new jet engine, tools, mechanics, a hangar, scaffolding, engine test equipment, aircraft inspectors, test pilots, etc. A comprehensive bill of resources allows for the most efficient performance of a procedure since it will insure that all the required resources are available at the appropriate time. In fact, if the bill of resources is developed in conjunction with a procedural pathway, or is organized along the lines of a procedural pathway, the performance of the procedure is greatly enhanced since it will then be known just what resources are required when, thus minimizing the amount of required materials and supply inventory and reducing the risk that labor and equipment resources are idle while waiting for other steps in the procedure to occur.

A very detailed description of the use of procedural pathways and bills of materials based thereon for use in an integrated medical supply system is described in U.S. patent application Ser. No. 08\489,496, filed on Jun. 12, 1995, and entitled Method For the Supply of Medical Supplies to a Health-Care Institution Based on a Nested Bill of Materials On a Procedure Basis. Also, the concept of building bills of resources and tracking resource utilization is described in U.S. patent application Ser. No. 08\846,798, filed on Apr. 30, 1997, and entitled Method and System for the Tracking and Profiling of Supply Usage in a Health Care Environment. The entire disclosures of these applications are hereby incorporated by reference thereto as if set forth fully herein. While not necessary to the practice of the present invention, use of the procedural pathway concept provides a convenient method for the construction of bills of resources for various procedures.

As described in the Background, one problem with bills of resources is that even within and organization and for a given procedure multiple bills of resources may be used. There are a variety of reasons that the different bills of materials may be required: the subject of the procedure may vary, the different people performing the procedure may have different preferences, different but similar procedures are being performed, etc. Obviously, the extreme, ideal situation (from a standardization point of view) would be that for an organization, only one bill of resources would be used for all procedures, regardless of variations. This singular bill of resources would provide complete standardization (i.e. would include all resources which would be used in any procedure) and allow for predictability in inventory control, labor management, equipment purchasing and maintenance, etc. However, the cost of such a comprehensive bill of resources would be prohibitive because a lot of waste would likely be present. In order for the bill of resources to be comprehensive, the resources required for any variation of the procedures performed by the organization would have to be included, even when those resources would only be used a fraction of the time. Obviously, some middle ground must be reached between standardization of bills of resources and customization of bills of resources.

Turning now to the context in which this invention was developed, but not limited to, health-care facilities are an arena where bills of resources for various procedures are developed. In the context of the above general description, there are many opportunities for standardization in the medical field. For example, in a hospital stay, some patients will go through identical steps in a procedural pathway, regardless of what the medical condition of the patient is. All patients will be admitted, have certain bloodwork done, be issued certain identification and supply items. Thus, regardless of whether the patient is in the hospital for a heart bypass operation or to have a facelift, there is some degree of standardization of the bill of resources for both procedures that can be made.

For example, in the admission process, the bill of resources is likely to include certain forms that must be filled out, certain labor resources who take the patient information, data st entry labor, identification supplies such as wrist i.d. bracelets, etc. Similarly, the baseline bloodwork is probably the same for nearly all patients and would require a labor resource for collecting the blood, certain supplies such as blood collection kits and vials, laboratory resources, etc.

However, as different procedural pathways continue, or even as identical procedural pathways directed to different patients continue, at some point the pathways diverge, at which point lock-step standardization is not only not efficient, but is detrimental. In the past, in order to enhance efficiency, hospitals had attempted to standardize supply ordering by negotiating pricing through group purchasing organizations, which would contract with a particular supplier in order to get the best price for certain types of medical supplies. Another solution was to utilize unitized container systems which attempted to minimize hospital inventory requirements (but typically which did not assist in optimizing standardization of bills of resources). Also, hospitals would use O.R. scheduling software to arrange for the use of equipment and labor resources during a given procedure. However, such systems were not integrated and could not select the ideal bill of resources for a given procedure. In fact, such attempts typically result in standardization at the expense of efficiency; i.e. often the use of supplies which are not preferred by care givers is dictated by the group purchasing contract and, while the software helps predict demand for OR's equipment and labor resources, they cannot help analyze the utilization of such resources and optimize the availability of such resources.

For ease of reference throughout the remainder of the Detailed Description, we will call each bill of resources to be analyzed in accordance with the present invention a "model" and we will refer to each item listed in the bill of resources as a "resource." Typically, resources will be a supply, a labor resource, a facility or a piece of equipment; thus, a resource could be a suture tray, a scrub nurse, an operating room, or a heart lung machine.

Figure 1:
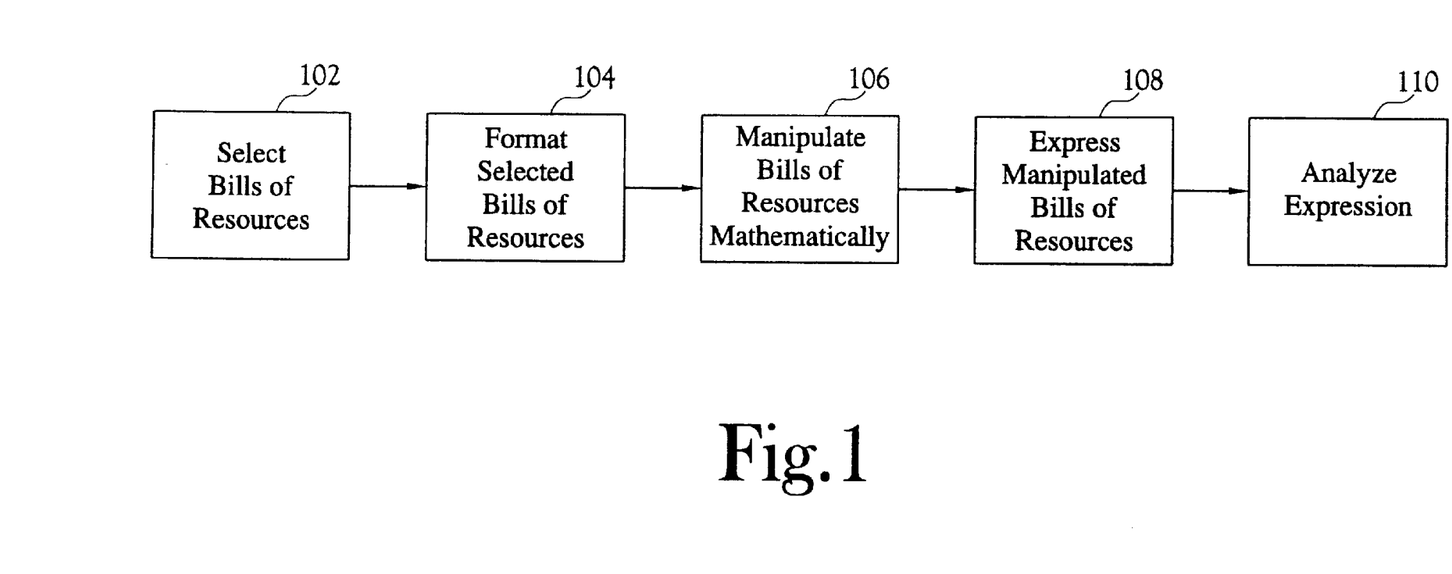
FIG. 1 is a block diagram of the method of the present invention.

Turning now to the description of the present invention, there is shown in FIG. 1 a block diagram 100 showing the steps of carrying out a preferred embodiment of the present invention. The first step 102 in carrying out the present invention, is selecting the bills of resources for which analysis or optimization is to be performed. Although this step may seem trivial, it is in fact very important. For example, the goal may be to find a standard bill of materials for a given type of medical procedure, such as a total hip replacement. In that case, the bills of materials for all total hip replacement surgeries would need to be collected. In another situation, it may be desired to analyze resource utilization for all procedures done in the hospital to identify similarities and differences; in that case, bills of resources for all procedures performed by the hospital would need to be acquired. Finally, in another situation, it may be desirable to determine how consistent a single doctor is in terms of resource utilization; in that case, a bill of resources for all procedures performed by that doctor would need to be acquired.

After the desired bills of resources are accumulated, the second step 104 is to format the bills of resources into a format in which the bills of resources can be manipulated mathematically. Again, this step may seem trivial, but given the complexity of a bill of resources for even a simple procedure, the manner in which the information is formatted becomes important. As will be described in detail below, the preferred format for this step 104 is a matrix in which each column is a model and each row is a resource. Thus the matrix will have a width equal to the number of models to be analyzed and length equal to the total number of different resources present in all of the models. The actual numbers present in the matrix will be the number of units of a given resource present in a given model. Optionally, it may be desirable to include other information such as the aggregate cost of that resource or historical information on the number of units of that resource actually used instead of the number of units provided in the bill of resources. Thus, it should be apparent that with even relatively simple bills of resources (models), the matrix built from the models will be very complex.

The third step 106 is to manipulate the matrix mathematically in order to highlight the similarities or differences of the various models analyzed. In the case of the preferred embodiment described in more detail below, the mathematical manipulation involves the manipulation of the matrix using matrix factorization and rank reduction techniques to reduce the number of scalar values representing each model to two or more. In effect this reduces the number of values representing the model from the large number equal to the number of rows in the original matrix, to a smaller number of values which can be more easily analyzed.

The fourth step 108 is to express the manipulated models in a format in which the relative position of each of the models may be determined. The expression of the manipulated models allows analysis to be done with models having a dimension equal to the number of total number of resources across all the models (a very large number) in a format in which the dimension of the expression is more manageable. For example, if there are a total of 300 resources listed in the models to be analyzed, then the number of rows in the matrix expression of those models is equal to 300 and the analysis of the un-manipulated matrix would need to be analyzed in 300 dimensions. Obviously, the analysis of a problem in 300 dimensions is very difficult, even with computer assistance. However, the expression of the manipulated matrix in a reduced number of dimensions makes the analysis of models much simpler.

Using the techniques described below, the number of dimensions of the expressed model may be selected; if it is desirable to analyze the information on a two-dimensional plot, then the dimension of the expression can be selected to be two, if a three-dimensional projection is desired, then the dimension of the expression can be selected to be three, or if a more complex expression, for computer analysis is desired, some higher value for the dimension of the expression may be selected. The key attribute of the expression is that the large dimension required by the number of components of the bills of resources is reduced to a more manageable level, while still retaining usable information about the relative similarity or dissimilarity of the models being analyzed.

The final step 110 in the method of the first preferred embodiment is to analyze the expression of the manipulated models. This analysis may be can range from measuring the distance between models, to determine how similar or dissimilar they are, to attempting to group models by their degree of similarity for the purposes of developing standardized bills of resources for the grouped models. Another type of analysis would be to compare proposed standardized bills of resources to actual bills of resources to measure the effectiveness of the standardization attempt. Also, this method could be used to analyze historical usage information from bills of resources reflecting actual usage of resources during procedures to find variations and deviations among similar procedures or to identify similarities among disparate and distinct procedures.

As will be described below, the technique utilized to manipulate the mathematical models 106, must be selected so as to highlight the desired similarities between the models. This selection is important to the functionality of the process, because improper selection of the manipulation technique could make the analysis useless. For example, the preferred matrix factorization technique described below was selected because it incorporates the $l_2$ Norm (which is the matrix equivalent to a least squared error scalar calculation) which serves highlight the similarities between models; i.e. after the manipulation, the most similar models, in the least squared error sense, will have assigned numerical values that are similar. However, if an appropriate manipulation technique is not selected, the manipulation may highlight insignificant similarities or the assigned numerical values of the models will not reflect any useful comparative information.

Figure 2:
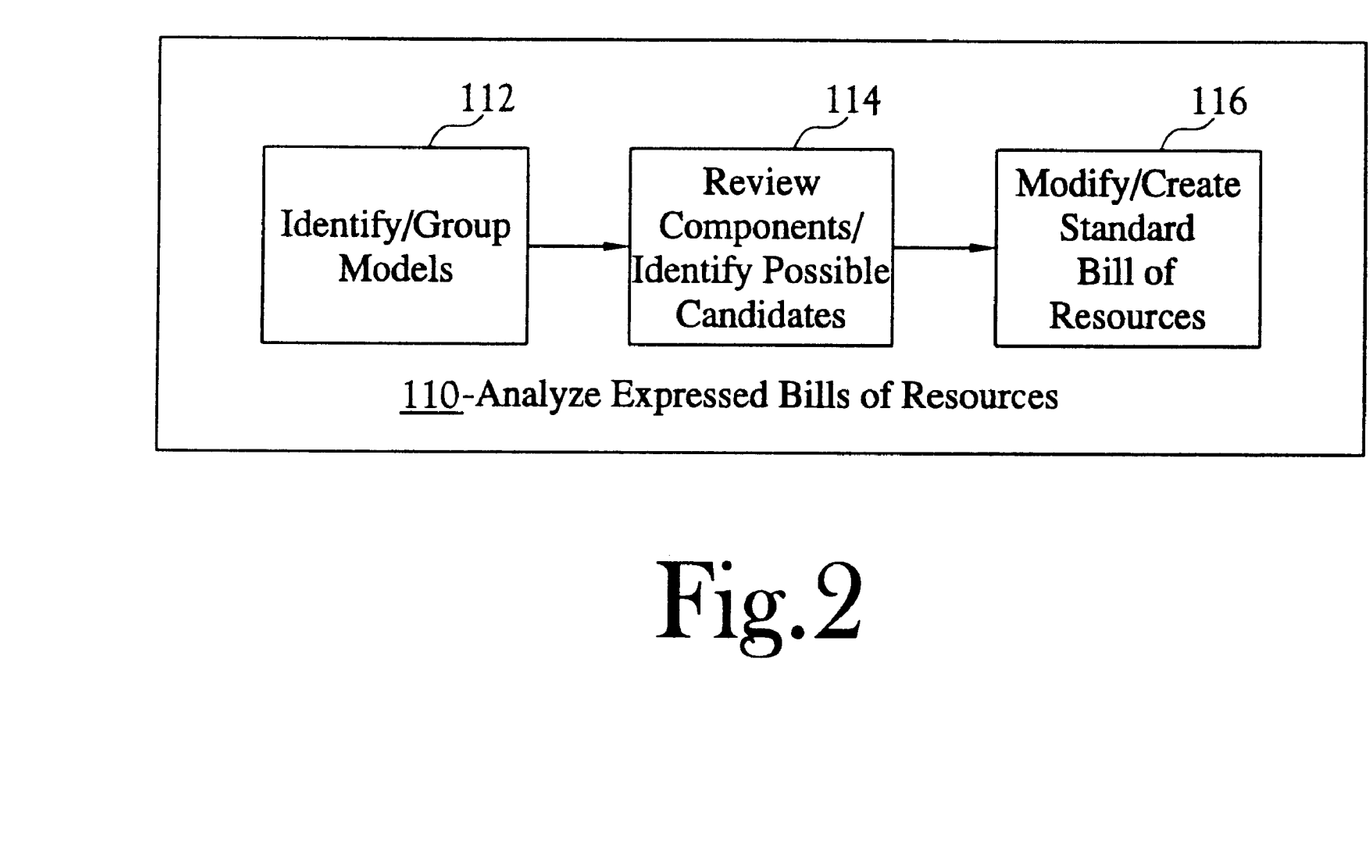
FIG. 2 is a block diagram showing additional steps of a preferred embodiment of the present invention.

Referring now to FIG. 2, additional steps associated with a further embodiment of the present invention are shown. This embodiment is an expansion of the analysis step 110 described in FIG. 1. In FIG. 2, the analysis takes multiple steps. The first step 112, is to identify clusters of relatively similar models as likely candidates for optimization or standardization. As will be described more fully hereinafter, the method of identifying similar models will depend on the method used to express the manipulated models (108 of FIG. 1). For example, if the expression is a two dimensional or three dimensional graph, then a simple look at the graph may suffice to identify clusters of similar models. However, if the expression is in more dimensions, then computer analysis of the expression may be used. For example, regardless of the number of dimensions of the expression, a computer could be used to perform vector subtraction of the models relative to each other and by selecting a threshold value, similar models may be defined; i.e. all models in which the vector difference between models is below some value could be considered similar. Also, various grouping/clustering algorithms could be developed which would serve to identify similar models based upon the expression.

Once the models are grouped/clustered 112, the next step 114 would be an analysis of the individual components of the original bills of resources from which the models were generated. This component analysis 114 includes the identification of components which may be standardized among the various bills of resources, and can also be used to identify components which have an aberrational usage history in one or more bills of resources. This step 114 serves the purpose of identifying strategies for standardizing a bill of resources or modifying usage patterns in order to more efficiently select and provide resources for use during a procedure.

The final step 116 of FIG. 2 is the step of modifying one or more bills of resources in response to the previous described steps. This modification 116 can be linked to the identification of a standard bill of resources which would be used in all procedures or a portion of a bill resources could be standardized with the remainder retaining differences present in the original models. Another form of modification 116 would relate to the method in which one standardized bill of resources could be selected. In some instances, it might be desirable to pick the one model which is the most similar to all of the other models as the standard bill of resources and require that all of the other bills of resources conform to that one. In other situations, it might be that the bill of resources associated with the doctor that performs the largest number of procedures might be selected. In still other circumstances, a completely new bill of resources, which represents the greatest amount of similarity to the largest number of the analyzed bills of resources, might be developed. In yet another set of circumstances, the analyzed bills of resources might be actual usage histories (consumed resource lists) reflecting resource utilization in a given procedure or for a given doctor; in this case, the modification to the bill of resources may be made to more accurately reflect the actual usage patterns.

Referring now to FIGS. 3–6, a description of a preferred method for implementing the present invention will be described. It should be noted that the preferred implementation of the invention is currently tied to the use of matrix and vector mathematics and in particular to the techniques of matrix factorization and rank reduction. However, other matrix manipulation techniques might be used to achieve the results described below. Furthermore, although it is currently believed that due to the form of bills of resources matrix and vector mathematics are the most readily apparent techniques for analyzing bills of resources, other mathematical techniques not limited to matrices and vectors could be used to analyze the information.

Figure 3:
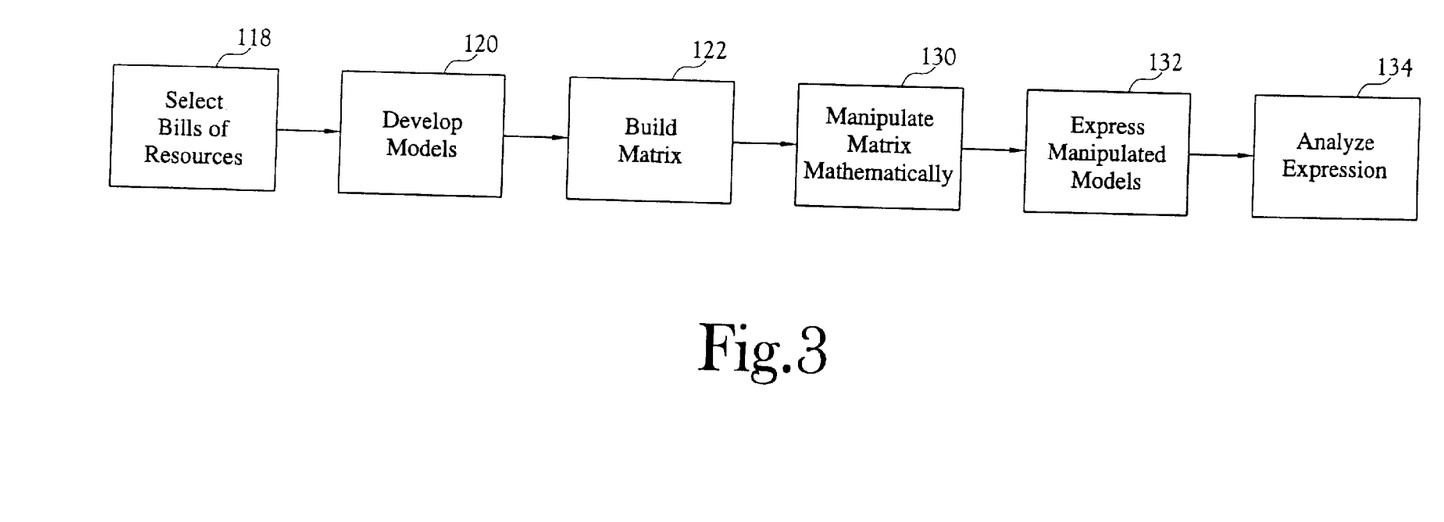
FIG. 3 is a block diagram showing an alternative embodiment of the method of the present invention.

Referring now to FIG. 3, the first step in the preferred embodiment shown therein is the selection of the bills of resources to be analyzed 118. This step 118, although it sounds basic, is important because the selection of the bills of resources must be consistent with the type of analysis to be performed. For example, if the interest is in developing standardized bills of resources on a procedural level, then the selected bills of resources would be all those associated with a given procedure. However, if the desired analysis is to be used to look for standardization opportunities across all orthopedic procedures, then the universe of bills of resources would be different.

Once the bills of resources to be analyzed have been selected 118, the next step 120 is to develop a model for each bill of resources. Referring now to FIGS. 3 and 4, there is shown in FIG. 4, a model based upon a bill of resources. Basically the model is a table with a listing of all of the resources present in the subject bill of resources with the number of units indicated next to each resource. Ultimately, the resource listing in each model will be identical and will be comprehensive across the models, the differences will be in the number of units of each resource indicated for a given model. For example, if it is discovered that in a second or later model, there is a listed resource which is not included in the first model, then the first model will be modified to include this resource, the number of units of that resource for the first model will simply be zero. This process will be repeated until the resource listing is comprehensive.

Once models have been constructed 120 for each of the bills of resources to be analyzed, a matrix 122 is constructed 122 in which the columns correspond to the models and the rows correspond to the resources. The matrix will have a dimension of M×N where M is the number of resources across the models and N is the number of models. There is shown in FIG. 5 a sample matrix 124. This sample matrix has 4 columns 126 corresponding to 4 models and 63 rows 128 corresponding to a set of 63 resources across the models. As described previously the individual numbers of the matrix identify the particular number of a given resource present in a given model.

Once the matrix has been constructed 122, the mathematical manipulation 130 of the matrix will be performed. In the preferred embodiment of the present invention the matrix will be factored and its rank reduced as set forth below.

Assume a constructed matrix $A \in R_{M \times N}$, $$A = [\underline{a}_1 \; \vdots \; \underline{a}_2 \; \vdots \; \cdots \; \vdots \; \underline{a}_N] \qquad \text{Eq. 1}$$

where $\underline{a}_n \in R_{M \times 1}$, n=1 . . . N represents a model and the elements in $\underline{a}_n$ are the resources of the $n^{th}$ model. Then the matrix A can be expressed using one of many matrix factorization techniques. One classical technique is known as Singular Value Decomposition (SVD), in which the matrix $A_{M \times N}$ is expressed as, $$A_{M \times N} = U_{M \times M} \Sigma_{M \times N} V_{N \times N}^T. \qquad \text{Eq. 2}$$

where the matrix subscripts have been included to explicitly designate the dimension of each matrix. The columns of $U_{M \times M}$ are called left singular vectors, and the columns of $V_{N \times N}$ are known as right singular vectors. The matrix $\Sigma_{M \times N}$ consists of zeros with the exception of its main diagonal containing the singular values of $A_{M \times N}$. Matrix $A_{M \times N}$ is generally of full rank; that is, none of its singular values equals zero.

It is desired to represent the data matrix $A_{M \times N}$ in an r dimensional subspace. One method of accomplishing this is to express the columns of $A_{M\times N}$ as linear combinations of r vectors which span the desired subspace. In the following equations r=2 is used for convenience, but in general $1 \leq r \leq \min(M,N)$. Thus $A_{M\times N}$ may be approximated by the rank 2 matrix $\hat{A}_{M\times N}$, $$\hat{A}_{M\times N} = [\alpha_1 \underline{b}_1 + \beta_1 \underline{b}_2 \ \vdots \ \alpha_1 \underline{b}_1 + \beta_2 \underline{b}_2 \ \vdots \ \cdots \ \vdots \ \alpha_N \underline{b}_1 + \beta_N \underline{b}_2]. \quad \text{Eq. 3}$$

Where $\underline{b}_1, \underline{b}_2$ form a basis for $R_2$. The coefficient pairs $(\alpha_n, \beta_n), n=1 \ldots N$ can then be used to represent each model in the 2 dimensional space, aiding in further analyses of relationships among models.

The next step is determination of the coefficients $(\alpha_n, \beta_n)$, n=1 ... N. This can be done using information from a matrix factorization technique. In the case of the SVD factorization technique, one may employ a standard rank reduction technique to express $\hat{A}_{M\times N}$ as, $$\hat{A}_{M\times N} = [\sigma_1 v_{11} u_1 + \sigma_2 v_{12} u_2 \ \vdots \ \sigma_1 v_{21} u_1 + \sigma_2 v_{22} u_2 \ \vdots \ \cdots \ \vdots \ \sigma_1 v_{NI} u_1 + \sigma_2 v_{N2} u_2]$$

where $\sigma_i = \Sigma(i,i)$, $v_{ij} = V(i,j)$, and $\underline{u}_i = i^{th}$ column of U. This representation of $\hat{A}_{M\times N}$ is analogous to the desired representation with, $$\underline{\alpha} = \begin{bmatrix} \alpha_1 \\ \alpha_2 \\ \vdots \\ \alpha_N \end{bmatrix} = \begin{bmatrix} \sigma_1 v_{11} \\ \sigma_1 v_{21} \\ \vdots \\ \sigma_1 v_{NI} \end{bmatrix} = \sigma_1 \underline{v}_1 \quad \text{Eq. 5}$$

$$\underline{\beta} = \begin{bmatrix} \beta_1 \\ \beta_2 \\ \vdots \\ \beta_N \end{bmatrix} = \begin{bmatrix} \sigma_2 v_{12} \\ \sigma_2 v_{22} \\ \vdots \\ \sigma_2 v_{N2} \end{bmatrix} = \sigma_2 \underline{v}_2 \quad \text{Eq. 6}$$

where $\underline{v}_i = i^{th}$ column of V and $\underline{b}_1, \underline{b}_2$ corresponds to $\underline{u}_1, \underline{u}_2$. The preferred standard rank reduction technique is that described in Matrix Computations, Second Edition, Golub, Gene H. and Van Loan, Charles F., The Johns Hopkins University Press, Baltimore, 1989, at pp. 70–73; the text of which is incorporated by reference as if set forth fully herein.

By this mathematical technique, each model can now be expressed with two values $\alpha_i$ and $\beta_i$ (since the selected dimension was 2). With each model now expressed as two scalar values, the models may be expressed 132 in a two dimensional graph which will visually highlight which models are similar and which are different.

Figure 6:
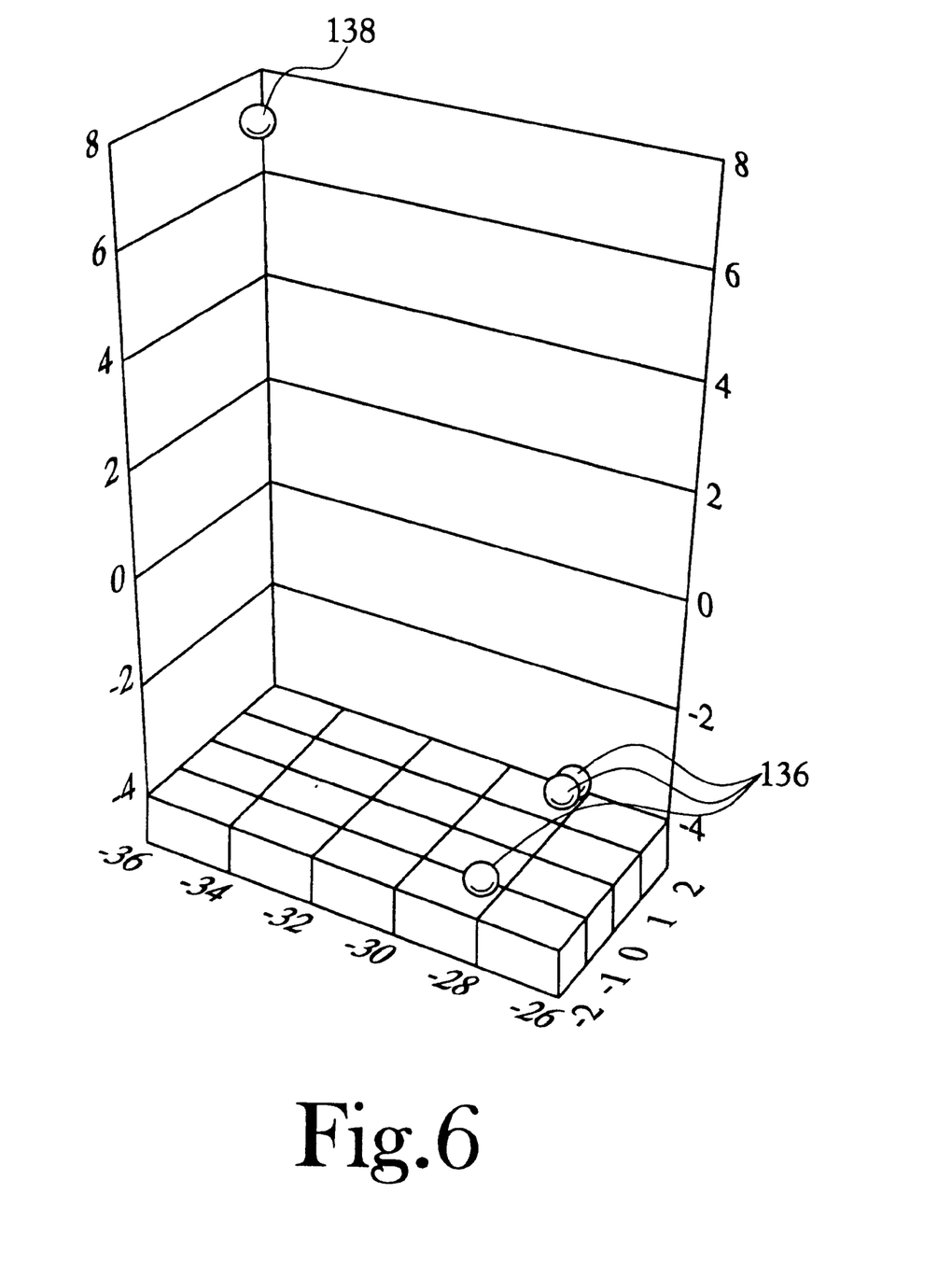
FIG. 6 is a printout of a graph generated in accordance with a preferred embodiment of the present invention.

Referring now to FIG. 6, a graph is shown for an actual set of models. The selected number of dimensions for the graph is actually 3 (as opposed to 2 which was used in the development of the mathematical discussion above; to one skilled in the art, the substitution of r=3 for r=2 in the above described mathematical development is readily accomplished). For analysis on a hard copy graph, the preferred dimension is probably 2; however, for viewing on a computer, the preferred dimension is probably 3 since more information can be conveyed and the inherent display features of computers can be used to rotate the 3 dimensional display to allowing viewing from various angles.

Regardless of the number of dimensions used to display the mathematically manipulated models, the next step 134 in the method of the preferred embodiment is to utilize the expression 132 to analyze the various bills of materials from which the models were derived. Probably the simplest form of analysis would be to identify any aberrational models which are a relatively large distance from the rest of the models in the expression. For example, if the models represent the doctor preference cards of various physicians performing the same surgery, identifying an outlying model from the graph would allow the hospital to attempt to reform that bill of resources in order to bring that doctor's resource utilization more in line with the norm.

Alternatively, the models may represent actually logged procedures for a single physician and the distances between the expressed and manipulated models will represent variations in resource utilization from one performance of a procedure to the next. This type of analysis would allow for the care provider to identify areas in which variations may be minimized.

As a more detailed form of analysis, the expressed information may be the basis for a more involved analysis as will be described with respect to FIG. 7. As can be seen from the graph of FIG. 6, there will often be groups 136, 138 of expressed models which are relatively close to each other. These grouped models represent similar bills of resources. If the goal of the analysis is to replace multiple bills of resources (in the case of a surgical procedure, one doctor preference card for each doctor performing the procedure) with a smaller number of standard bills of resources, or even a single bill of resources, then the logical starting point is to identify the most closely related bills of resources, since standardization among the similar bills of resources may be accomplished with the minimum number of changes.

Alternatively, instead of performing the matrix factorization and rank reduction techniques, the various models may be averaged on a row by row basis to develop a "best fit" model (i.e., the number of units of resources indicated in each row of the model can be averaged or the mode or median calculated). This "best fit" model can then be compared to the other models using any mathematical comparison technique such as vector norms, correlation, etc. to determine how each model differs from the "best fit" model and the degree of similarity or dissimilarity can be expressed as numerical values. While the factorization and rank reduction techniques provide the advantage that a graphic representation of the models can be generated more easily, and therefore that the degree of similarity of the models may be identified visually, the averaging technique results in an expression from which similarities among the models can be determined.

Figure 7:
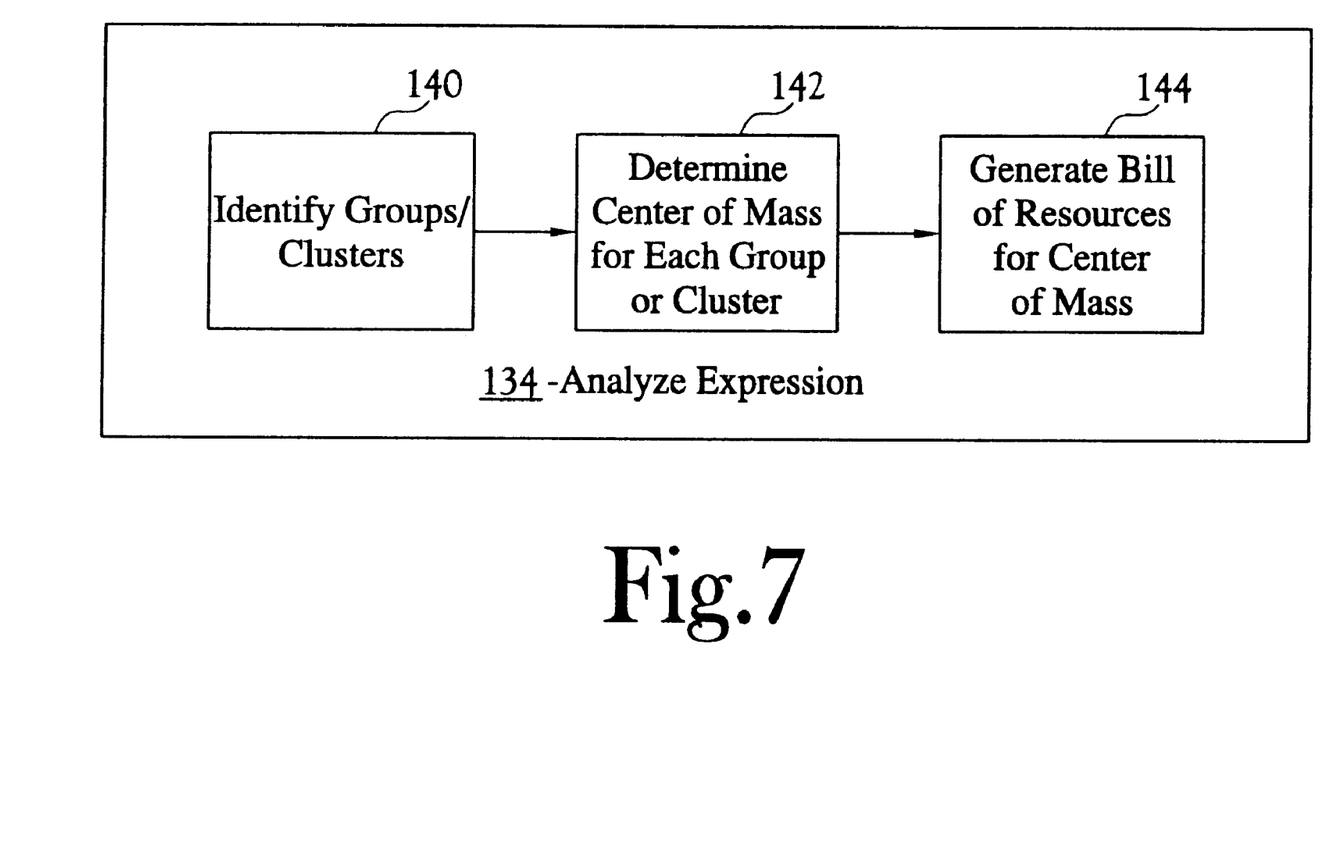
FIG. 7 is a block diagram showing the method steps of an alternative embodiment of the present invention.

Referring to FIG. 7, a further embodiment of the invention will be described. With respect to FIG. 7, the first step 140 of the method is to identify groups or clusters of expressed models (136, 138 from FIG. 6) which are relatively close together. The next step 142 is to identify a model which represents a "center of mass" of the cluster. This step 142 may be as simple as identifying an actual expressed model which is near the center of the cluster as the center of mass, or may be done by calculating the location of a model which would be the center of mass of the group or cluster. The final step of the method described in FIG. 7 is to generate a standardized bill of resources from the model representing the "center of mass" of each identified cluster or group of models.

In the preferred embodiment of the present invention, the Center of Mass of a cluster of models is calculated using a weighted average method. For example, each of the expressed models represents a bill of resources for a procedure being performed. However, some bills of resources are more important than others; it may be that one bill of resources is used more than others or that one bill of resources is preferred by a more senior physician. In these circumstances, in addition to the data points associated with the expressed models in a cluster, each model would be assigned a "weight" representing the relative importance of the model in performing the center of mass calculation.

Assume that a cluster for analysis included in a given study is comprised of N models. That is, there are N data sets (each data set=2 numbers for 2D, 3 numbers for 3D, etc.). It is desired that the average (center of mass) of the data cluster be determined in such a fashion that weighting is introduced. This weighting can be arbitrary or can be systematic in that, if each model represents a bill of materials (BOM) for a certain procedure, the relative importance of each model (BOM) can be determined by the number of procedures performed in a given interval. Arbitrary weighting can also be assigned in order to give preference to desired models.

The following is a numerical example of a study. Given a cluster of 5 models which are represented in 2D, they may be weighted as follows:

| Model # | Data Set (x,y) | Weights |
|---------|----------------|---------|
| 1 | (1.5, 3.7) | 25 |
| 2 | (2.0, 2.5) | 100 |
| 3 | (1.7, 3.0) | 400 |
| 4 | (2.5, 4.0) | 11 |
| 5 | (1.8, 2.7) | 30 |

In this example, each model represents a distinct BOM that is used for a medical procedure. The weights represent how many procedures are performed monthly. The 2D coefficients were determined based on the Matrix factorization approach described previously.

The weighted COM for a 2D data set would be calculated as follows:

$$COM = (\eta_x, \eta_y) \text{ where } \eta_x = \sum_{i=1}^{N} \alpha_i x_i, \ \eta_y = \sum_{i=1}^{N} \alpha_i y_i \text{ and } \alpha_i = \frac{w_i}{\sum_{i=1}^{N} w_i} \quad \text{Eq. 7}$$

Thus the $\alpha_i$ is a percentage of the total weighting for the cluster being analyzed. For the numerical example given above, $\alpha_1 = 25/566$, $\alpha_2 = 100/566$, and so on. The weighted COM= (1.7650, 2.9461).

When calculating the standard deviation (STDEV) for the 15AKS cluster, the weighted COM is used. The STDEV formula for the x coefficients is given by, $$STDEV_x \frac{1}{N-1} \left[ \sum_{i=1}^{N} (x_i - \eta_x)^2 \right]^{1/2} \quad \text{Eq. 8}$$

and likewise for the y coefficient. This 2 dimensional development is easily extended into an arbitrary number of dimensions. For R dimensions, each data set would contain R components. The COM would have R components, and R STDEV components would be obtained.

With the center of mass calculation performed, the generation 142 of the standard bill of resources is performed by substituting the calculated values into the matrix by substitution of the calculated center of mass coordinates into Equation 3 described previously; the center of mass values would correspond to the $\alpha$ and $\beta$ coefficients for a new model, which can then be reconstructed as a complete calculated model. This action results in a un-factored model from which the bill of resources may be recovered. Alternatively, for a given cluster or group of similar models, one model may be selected as the standard for the cluster or group. For example, if one of the models is positioned near the center of the group, or if one model fits certain criteria such as lowest cost or most uses in a given time period, then that model may be selected as the basis of the standard bill of resources as opposed to conducting a center of mass calculation.

The preferred method of the present invention is implemented in computer software. For the purposes of inputting the information concerning the bills of resources, and displaying the information, a common database program may be used. For example, for the model shown in FIG. 4 and the matrix shown in FIG. 5, Microsoft's SQL/Server software was used in order to organize the data and display it. Other database programs such as Microsoft Access could be used as well. Additionally, to the extent that the information from the bill of resources is available from some other source, it could be imported in electronic form from another application. For example, DeRoyal's RCL™ software, described in co-pending application No. 08\846798 and previously incorporated by reference describes a software package for managing bills of resources and resource consumption. In the preferred implementation of the present invention, the electronic version of a bill of resources is generated by utilizing that software.

Additionally, the mathematical calculations previously described were implemented in software using Rogue-Wave's math software (and could be implemented with a variety of software packages such as Matlab++, Mathematical, MathCad, etc.) which provided code in a C++ format. The remainder of the software was developed using C++ in an object oriented environment such as OLE or ActiveX. One skilled in the art will easily identify a variety of ways of implement the preferred method using various programming languages, operating systems, computer platforms, etc. The preferred environment is an object oriented programming language (such as C++) and a Microsoft Windows 95 or NT platform, using ActiveX or OLE controls and a client/server database such as SQL/Server.

The analysis of the bills of resources can be performed for a variety of purposes, including standardization or optimization of a bill of resources. As described above, depending on the bills of resources selected, the preferred embodiment will allow a multitude of different questions to be asked concerning bills of resources. For example, as described, one primary use of the invention is to create a standard bill of resources for a given procedure in order to minimize deviations in usage and to maximize efficiencies of scale and distribution. However, by selecting bills of resources indicating consumption of resources during procedures, one can determine how supplies are actually being used and look for deviations in usage. Also, bills of resources can be compared to actual resource utilization to see how closely actual usage is predicted by the bill of resources in order to determine if the bill of resources should be modified.

Also, bills of resources from different procedures may be reviewed to identify standardization opportunities for among different procedures. For example, many different medical procedures require utilization of many of the same resources. Thus, by using the present invention, opportunities for standardization of some items, across many procedures could be developed. Items common to many procedures could be grouped and then a partial standard bill of resources for those components could be developed. In fact, this procedure could be repeated at various levels of the procedural pathway to develop levels of standardized bills of resources at each stage of the procedural pathway. For example, regardless of the procedure to be performed, a standard bill of resources may be able to be developed for admission to the hospital and, possibly, initial labwork. Then, depending upon the patient, a standard bill of resources could be developed for all surgical, OB, etc. patients. Then a standard bill of resources could be developed for all orthopedic surgical patients. Then a standard bill of resources could be developed for all knee surgeries. Then standard bills of resources could be developed for all knee replacement surgeries. This process could be repeated until strong doctor preference variations are reached (which would signal the end of standardization opportunities). The creation of a comprehensive bill of resources for a given patient would then entail selecting the appropriate standard bills of resources for each stage of the procedural pathway down to the individual doctor preference items. However, even though the bill of resources is patient specific, this process insures that the maximum benefit of standardization/optimization has been achieved.

Again, as was described initially, while the application of the present invention was described in the medical field, the present invention is also applicable to other fields in which a procedure is performed. Wherever a bill of resources is used in order to schedule, order, inventory, allocate or otherwise assist in assurance that certain resources are available during the performance of a procedure, this technique is applicable. Furthermore, this method may be integrated into the business operations of an organization which is performing procedures to link with cost recovery, accounting, personnel, physical plant management, etc. systems in order to allow for the sharing of information in the entire business operation. For example, in the medical environment, this present may be used with supply utilization/management systems in order to provide procedure cost information to the billing department of a hospital for the billing of a patient. Similarly, the present invention can be used in connection with the accounting systems of a business in order to insure that the most effective use of supplies is being made and to help identify strategies for cost reduction.

The above-described embodiments are capable of numerous substitutions, deletions, modification and changes without departing from the scope of the claims set forth below. For example, the present invention could be implemented in a variety of manners, including various computer platforms, operating systems, programming languages, etc., without departing from the scope of the claims. In fact, although specific information concerning the software implementation of the present invention was given herein, one skilled in the art, with this description, could easily adapt the present invention to implementation on almost any computer platform/operating system/database software/programming language combination presently on the market. All of which may be done without departing from the scope of the claims.

We claim:

1. A method for the production of at least on standard bill of resources, from bills of resources which include a list of resources to be utilized in performing a procedure, comprising the computer-implemented steps of:

selecting a plurality of bills of resources from a known universe of bills of resources;

developing a model for each of the selected bills of resources, each of said models including values which correspond to the number of units of given resources from the selected bills of resources;

manipulating said models mathematically to highlight similarities and dissimilarities of defined characteristics in said models;

expressing the manipulated models in a format in which a relative position of each of said manipulated models may be determined, the relative position of each of the manipulated models reflecting the degree of similarity or dissimilarity to the other manipulated models;

analyzing said selected bills of resources based upon the expression of the manipulated models; and producing the at least one stand bill of resources based on the analysis of the bills of resources.

2. The method of claim 1 wherein said step of manipulating said models mathematically further comprises:

selecting a number of dimensions in which each manipulated model will be expressed; and manipulating each model in accordance with a mathematical algorithm which will result in each manipulated model being expressible in the desired number of dimensions.

3. The method of claim 1 wherein said step of manipulating said models mathematically further comprises:

arranging said manipulated models in a matrix in which each manipulated model occupies a column of the matrix and each different resource occupies a row of the matrix, the number of columns equal to the number of models and the number of rows equal to the total number of different resources present in the bills of resources which are represented by the manipulated models;

selecting a desired dimension for expression of the models; and performing a matrix manipulation on the matrix according to a mathematical algorithm which will result in the number of rows of the matrix being reduced to the selected desired dimension for expression, the mathematical algorithm being selected to highlight similarities or dissimilarities among the models.

4. The method of claim 3 wherein said matrix manipulation comprises matrix factorization and rank reduction.

5. The method of claim 4 wherein said matrix factorization technique is singular value decomposition.

6. The method of claim 1 wherein said bills of resources are selected from a group of resources representing the same procedure performed by different persons and said analysis comprises the identification of similarities and dissimilarities of resource utilization among the different persons performing the procedures.

7. The method of claim 6 wherein said producing the at least one standardized bill of resources further comprises developing a number of standardized bills of resources for the procedure analyzed such that each of the different persons performing the procedure will be using one of said standardized bills of resources in performing the procedure, the number of standardized bills of resources being less than the original number of bills of resources analyzed.

8. The method of claim 1 wherein the bills of resources to be analyzed reflect the multiple performance of a given procedure by the same person, differences in the bills of resources reflecting different resource utilization among the performances of the procedure and said analysis includes consideration of the deviation in resource utilization among the performances of the procedure.

9. The method of claim 8 wherein said analysis of the selected bills of resources further comprises identifying inefficient deviations among the multiple performances of the given procedure by the same person and said producing the at least one standardized bill of resources further comprises development of the at least one standardized bill of resources to minimize such deviations in future performances of the procedure by the person.

10. The method of claim 1 wherein the bills of resources selected for analysis include bills of resources from more than one procedure and the step of analyzing the expressed models includes the identification of standardization opportunities across different procedures.

11. The method of claim 1 wherein the bills of resources selected to be analyzed include partial bills of resources which are limited to only certain types or categories of resources in order to identify standardization opportunities among limited types or categories of resources common to the bills of resources.

12. The method of claim 1 wherein the step of developing models of the selected bills of resources include filtering said bills of resource such that only certain resources from the bills of resources are included in the models.

13. The method of claim 12 wherein the step of filtering includes the selective retention or exclusion of certain resources or categories of resources.

14. A method for the analysis of bills of resources, which include a list of resources to be utilized in performing a procedure, comprising the computer-implemented steps of:

selecting a plurality of bills of resources from a known universe of bills of resources;

developing a model for each of the selected bills of resources, each of said models including values which correspond to the number of units of given resources from the selected bills of resources;

manipulating said models mathematically to highlight similarities and dissimilarities of defined characteristics in said models;

expressing the mathematically manipulated models in a format in which a relative position of each of said manipulated models may be determined, the relative position of each of the manipulated models reflecting the degree of similarity or dissimilarity to the other manipulated models, and plotting the position of each manipulated model on a graph;

analyzing said bills of resources based upon the expression of the manipulated models, and analyzing said graph to locate manipulated models which are located relatively close together to identify similar manipulated models, thereby identifying similar bills of resources; and producing the at least one standard bill of resources based on the analysis of the bills of resources.

15. The method of claim 14 where the step of producing the at least one standard bill of resources further comprises the steps of:

selecting at least one subset of manipulated models based upon their degree of similarity;

developing a standard bill of resources for the subset, said standard bill of resources including common resources from among the bills of resources identified by the manipulated models in the subset; and substituting said standard bill of resources for the bills of resources associated with the manipulated models from the subset.

16. The method of claim 15 wherein the step of developing a standard bill of resources further comprises:

calculating the center of mass of the subset of manipulated models based upon the relative position of the expressed manipulated models in the subset; and developing the standard bill of resources based upon the center of mass calculation.

17. The method of claim 3 wherein the step of developing a standard bill of resources further comprises:

assigning a weighting factor to each of the expressed manipulated models in the subset based upon the relative importance of the bill of resources to which each model corresponds;

calculating the center of mass of the subset of manipulated models based upon the relative position of the expressed manipulated models and the weighting factor assigned to each model of the subset; and developing the standard bill of resources based upon the calculated center of mass.

18. The method of claim 17 wherein the weighting factor is based upon the frequency that a given bill of resources is utilized.

19. The method of claim 17 wherein the weighting factor is based upon the cost associated with the bill of resources to which the weighting factor is assigned.

20. The method of claim 15 wherein said step of developing a standard bill of resources futher comprises:

assigning a weighting factor to each manipulated model present in the expression, the weighting factor representing the relative importance of the bill of resource to which the manipulated model corresponds; and utilizing said weighting factor in developing the standard bill of resources such that the higher weighted bills of resources will be given higher consideration in the development of the standard bill of resources.

21. A computer implemented method for the production of at least one standardized bill of resources, from bills of resources including lists of resources for use in the performance of a procedure comprising the following steps:

defining a set of bills of resources for analysis;

providing the defined set of bills of resources to a computer to develop a set of electronic bills of resources corresponding to the defined set of bills of resources, including;

generating a computer model of each of the bills of resources from the defined set of bills of resources;

organizing each of the models in a database program; and constructing a computer generated matrix from said models wherein one dimension of the matrix is determined by the number of models in the set and the other dimension of the matrix is determined by the total number of different resources across all of the selected bills of resources;

mathematically manipulating the electronic bills of resources according to an algorithm selected to characterize the electronic bills of resource according to their degree of similarity relative to each other;

expressing said manipulated bills of resources in a human or machine perceptible from such that the relative similarity or dissimilarity of the bills of resources is apparent;

analyzing said expressed bills of resources in order to enhance or optimize resource utilization; and producing the at least one standardized bill of resources based on the analysis of the bills of resources.

22. The method of claim 21 wherein the step of mathematically manipulating the defined set of bills of resources further comprises:

selecting a desired number of dimensions in which each of the selected models will be expressed; and operating on the matrix in accordance with an algorithm in order to reduce at least one dimension of the matrix to the desired number of dimensions.

23. The method of claim 22 wherein the step of operating on the matrix further comprises performing matrix factorization and rank reduction.

24. The method of claim 23 wherein the step of performing matrix factorization and rank reduction further comprises using singular value decomposition as the matrix factorization technique.

25. A computer implemented method for the production of at least one standardized bill of resources, from bills of resources including lists of resources for use in the performance of a procedure comprising the following steps:

defining a set of bills of resources for analysis;

providing the defined set of bills of resources to a computer to develop a set of electronic bills of resources corresponding to the defined set of bills of resources;

mathematically manipulating the electronic bills of resources according to an algorithm selected to characterize the electronic bills of resource according to their degree of similarity relative to each other;

expressing said manipulated bills of resources in a human or machine perceptible form such that the relative similarity or dissimilarity of the bills of resources is apparent;

analyzing said expressed bills of resources in order to enhance or optimize resource utilization; and producing the at least one standardized bill of resources based on the analysis of the bills of resources.

26. The method of claim 25 wherein said step of producing the at least one standardized bill of resources further comprises:

identifying at least one group of similar bills of resources based upon their relative positions in their expressed form; and developing a standard bill of resources for the group of similar bill of resources.

27. The method of claim 26 wherein the step of developing a standard bill of resources further comprises:

calculating the center of mass of the group of manipulated models based upon the relative position of the expressed manipulated models in the group; and developing the standard bill of resources based upon the center of mass calculation.

28. The method of claim 26 wherein the step of developing a standard bill of resources further comprises:

assigning a weighting factor to each of the expressed manipulated models in the group;

calculating the center of mass of the subset of manipulated models based upon the relative position of the expressed manipulated models and the weighting factor assigned to each model of the group; and developing the standard bill of resources based upon the calculated center of mass.

29. The method of claim 28 wherein the weighting factor is based upon the frequency that a given bill of resources is utilized.

30. The method of claim 28 wherein the weighting factor is based upon the cost associated with the bill of resources to which the weighting factor is assigned.

31. The method of claim 26 wherein said step of developing a standard bill of resources further comprises:

assigning a weighting factor to each manipulated model present in the expression, the weighting factor representing the relative importance of the bill of resources to which the model corresponds; and utilizing said weighting factor in developing the standard bill of resources such that the higher weighted bills of resources will be given higher consideration in the development of the standard bill of resources.

32. The method of claim 25 wherein said bills of resources are selected from a group of resources representing the same procedure performed by different persons and said analysis comprises the identification of similarities and dissimilarities of resource utilization among the different persons performing the procedures.

33. The method of claim 32 wherein said analysis further comprises developing a number of standardized bills of resources for the procedure analyzed such that each of the different persons performing the procedure will be using one of said standardized bills of resources in performing the procedure, the number of standardized bills of resources being less than the original number of bills of resources analyzed.

34. The method of claim 25 wherein the bills of resources to be analyzed reflect the multiple performance of a given procedure by the same person, differences in the bills of resources reflecting different resource utilization among the performances of the procedure and said analysis includes consideration of the deviation in resource utilization among the performances of the procedure.

35. The method of claim 34 wherein said analysis further comprises identifying inefficient deviations among the performances of the given procedure and development of a standardized bill of resources to minimize such deviations in future performances of the procedure by the person.

36. The method of claim 25 wherein the bills of resources selected for analysis include bills of resources from more than one procedure and the step of analyzing the expressed models includes the identification of standardization opportunities across different procedures.

37. The method of claim 25 wherein the bills of resources selected to be analyzed include partial bills of resources which are limited to only certain types or categories of resources in order to identify standardization opportunities among limited types or categories of resources common to the bills of resources.

* * * * *

UNITED STATES PATENT AND TRADEMARK OFFICE
CERTIFICATE OF CORRECTION

PATENT NO : 6,014,633
DATED : January 11, 2000
INVENTOR(S): DeBusk et al.

It is certified that error appears in the above-identified patent and that said Letters Patent are hereby corrected as shown below:

At column 6, line 47, replace "data st entry labor" with "data entry labor"

At column 8, line 33, delete "may be"

At column 11, line 7, correct Eq. 3 to read:
$$\hat{A}_{M\times N}=[\alpha_1\underline{b}_1+\beta_1\underline{b}_2 \;\vdots\; \alpha_2\underline{b}_1+\beta_2\underline{b}_2 \;\vdots\; \cdots \;\vdots\; \alpha_N\underline{b}_1+\beta_N\underline{b}_2].$$

At column 11, line 41, underline "Matrix Computations"

At column 14, line 36, replace "Mathematical" with "Mathematica"

At column 15, line 62, replace "on" with "one"

At column 16, line 15, replace "stand" with "standard"

Signed and Sealed this

Third Day of April, 2001

*Attest:*

NICHOLAS P. GODICI

*Attesting Officer*    *Acting Director of the United States Patent and Trademark Office*